United States Patent
Rengasamy

(10) Patent No.: US 11,156,283 B2
(45) Date of Patent: Oct. 26, 2021

(54) VEHICLE DRIVETRAIN DIFFERENTIAL ASSEMBLY

(71) Applicant: ArvinMeritor Technology, LLC, Troy, MI (US)

(72) Inventor: Srinivasa Perumal Rengasamy, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 40 days.

(21) Appl. No.: 16/598,567

(22) Filed: Oct. 10, 2019

(65) Prior Publication Data

US 2021/0108712 A1 Apr. 15, 2021

(51) Int. Cl.
| | | |
|---|---|---|
| *F16H 48/40* | (2012.01) | |
| *F16H 48/38* | (2012.01) | |
| *F16H 48/08* | (2006.01) | |

(52) U.S. Cl.
CPC ............. *F16H 48/40* (2013.01); *F16H 48/08* (2013.01); *F16H 48/38* (2013.01); *F16H 2048/385* (2013.01)

(58) Field of Classification Search
CPC ........................... F16H 48/08; F16H 48/38–40
See application file for complete search history.

(56) References Cited

U.S. PATENT DOCUMENTS

| | | | | | |
|---|---|---|---|---|---|
| 1,658,571 | A | * | 2/1928 | Ormsby | ................. F16H 48/08 475/230 |
| 4,959,043 | A | * | 9/1990 | Klotz | ..................... F16H 48/08 475/220 |
| 7,819,040 | B2 | * | 10/2010 | Meier | ..................... F16H 48/08 74/607 |
| 8,544,174 | B2 | * | 10/2013 | Isken, II | ................. F16H 48/22 29/893.1 |
| 10,012,302 | B2 | * | 7/2018 | Kiten | ...................... F16H 48/08 |
| 2005/0009662 | A1 | * | 1/2005 | Sudou | .................... F16H 48/08 475/231 |
| 2021/0033181 | A1 | * | 2/2021 | Oda | ........................ F16H 57/04 |
| 2021/0215240 | A1 | * | 7/2021 | Ozawa | .................... F16H 48/08 |

OTHER PUBLICATIONS

Raya, et al., U.S. Appl. No. 16/398,847, filed with the United States Patent and Trademark Office on Apr. 30, 2019.

* cited by examiner

*Primary Examiner* — Ernesto A Suarez
*Assistant Examiner* — James J Taylor, II
(74) *Attorney, Agent, or Firm* — Brooks Kushman PC

(57) ABSTRACT

A differential assembly includes a first case rotatable about an axis and defining a first mounting flange having a through hole and a second case abutting the first case to define a gear nest cavity therebetween. The second case further defines a second mounting flange having a through hole and formed to mate to the first mounting flange. The differential assembly also includes a ring gear mounted to the first mounting flange and fastener extending through the through hole of both the first mounting flange and second mounting flange into a fastener hole of the ring gear. Additionally, the first mounting flange is sandwiched between the second mounting flange and the ring gear.

20 Claims, 5 Drawing Sheets

VEHICLE DRIVETRAIN DIFFERENTIAL ASSEMBLY

TECHNICAL FIELD

This disclosure relates to a vehicle differential assembly.

BACKGROUND

A vehicle differential assembly receives a torque input from a propulsion source such as a combustion engine, electric machine, or combination thereof. The differential allows for torque and rotational speed to allocated asymmetrically to each of at least two vehicle road wheels.

SUMMARY

A differential assembly includes a first case rotatable about an axis and defining a first mounting flange having a through hole and a second case abutting the first case to define a gear nest cavity therebetween. The second case further defines a second mounting flange having a through hole and formed to mate to the first mounting flange. The differential assembly also includes a ring gear mounted to the first mounting flange and fastener extending through the through hole of both the first mounting flange and second mounting flange into a fastener hole of the ring gear. Additionally, the first mounting flange is sandwiched between the second mounting flange and the ring gear.

A differential assembly includes a first case rotatable about an axis and defining a first nesting portion and a second case defining a second nesting portion configured to nest with the first nesting portion. The differential assembly also includes a ring gear mounted to the first case and configured to nest with the first nesting portion. The differential assembly further includes a fastener extending through the first case and the second case into a fastener hole of the ring gear, wherein the first case is sandwiched between the second case and the ring gear.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
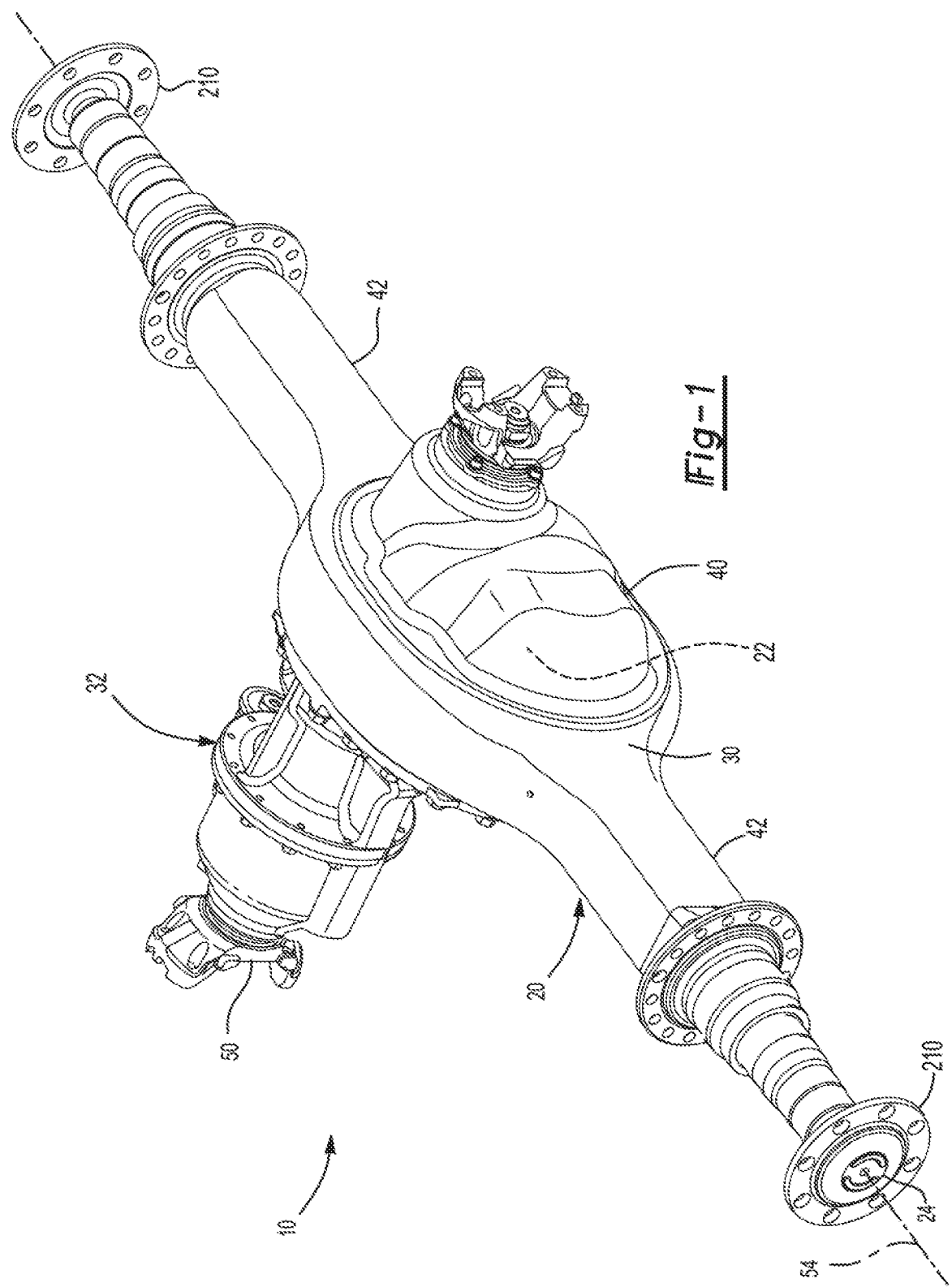
FIG. 1 is a perspective view of an axle assembly having a differential assembly.

Referring to FIG. 1, an example of an axle assembly 10 may be included as part of a vehicle propulsion system, for example, such as a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1 and 2, the axle assembly 10 may include a housing assembly 20, a differential assembly 22, and at least one axle shaft 24.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axle shafts 24. In at least one configuration, the axle housing 30 may include a center portion 40 and one or more arm portions 42.

The center portion 40 may be disposed proximate the center of the axle housing 30. The center portion 40 may define a cavity that may receive the differential assembly 22. The center portion 40 may include a carrier mounting surface. The carrier mounting surface may face toward and may engage the differential carrier 32. The carrier mounting surface may facilitate mounting of the differential carrier 32 to the axle housing 30. For example, the carrier mounting surface may have a set of holes that may be aligned with corresponding holes on the differential carrier 32. Each hole may receive a fastener, such as a threaded bolt, that may couple the differential carrier 32 to the axle housing 30.

One or more arm portions 42 may extend from the center portion 40. For example, two arm portions 42 may extend in opposite directions from the center portion 40 and away from the differential assembly 22. The arm portions 42 may have substantially similar configurations. For example, the arm portions 42 may each have a hollow configuration or tubular configuration that may extend around the corresponding axle shaft 24 and may help separate or isolate the axle shaft 24 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 24.

The differential carrier 32, which may also be called a carrier housing, may be mounted to the center portion 40 of the axle housing 30. The differential carrier 32 may support components of the differential assembly 22. For example, the differential carrier 32 may have one or more bearing supports that may receive or support a roller bearing assembly that may rotatably support the differential assembly 22.

Figure 2:
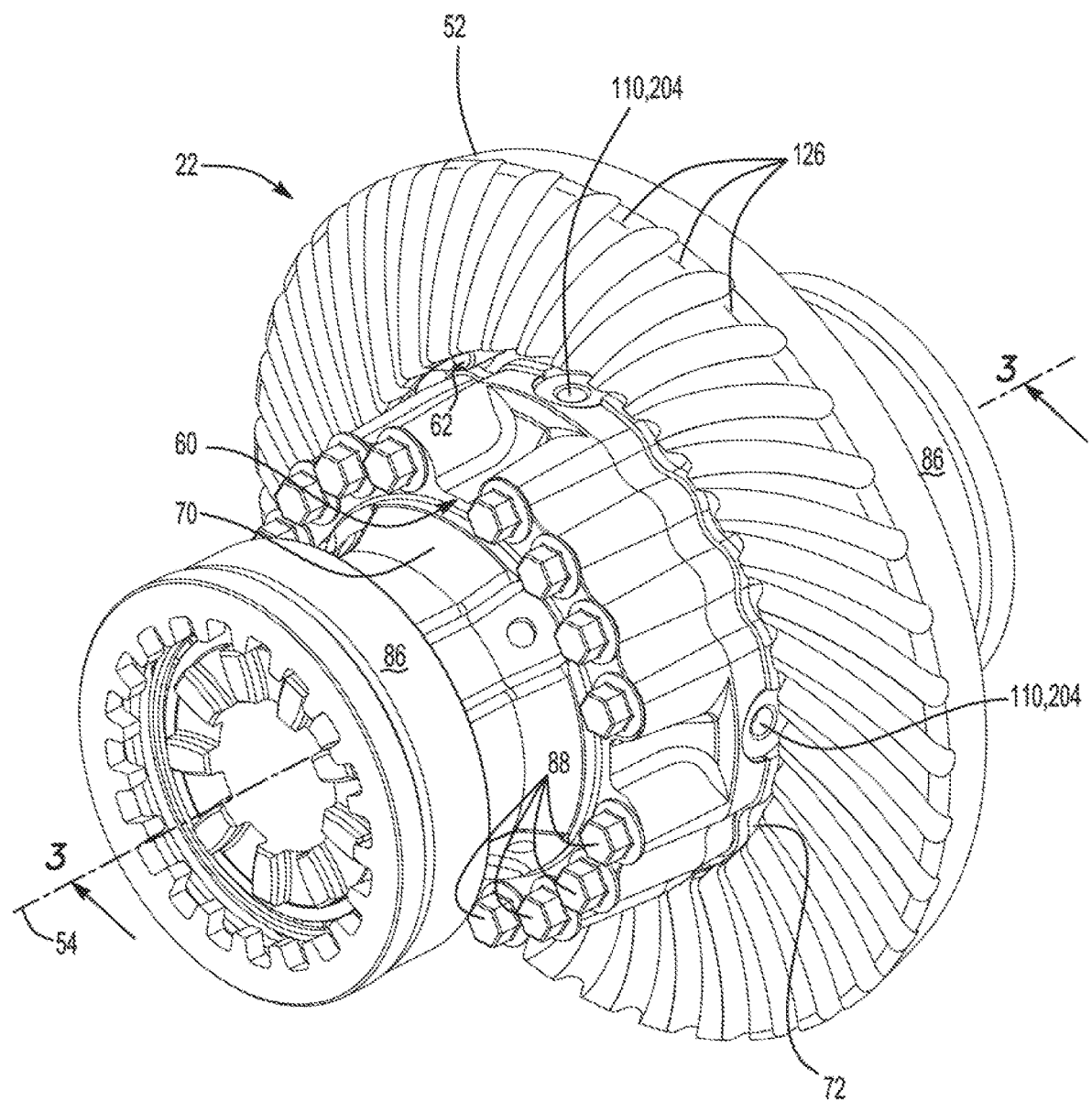
FIG. 2 is a perspective view of the differential assembly and bearing assemblies that rotatably support the differential assembly.

An input yoke 50, if provided, may be coupled to a vehicle drivetrain component, such as a drive shaft, that may be coupled to an output of a vehicle transmission or transfer case, which in turn may receive torque from a vehicle propulsion source, such as a combustion engine or electric motor. Alternatively, the input yoke 50 may be operatively connected to an output of another axle assembly. The input yoke 50 may be connected to or integrally formed with an input shaft that may be rotatably supported by one or more roller bearings that may be disposed on the differential carrier 32. The input shaft may be operatively connected to a drive pinion or may be integrally formed with the drive pinion. The drive pinion may provide torque to a ring gear 52, which is best shown in FIG. 2, that may be provided with the differential assembly 22 as will be discussed in more detail below. For example, the drive pinion may have teeth that meshingly engage teeth of the ring gear 52 such that rotation of the drive pinion may rotate the differential assembly 22 about an axis 54. The differential assembly 22 may be operatively connected to the axle shafts 24. As such, the differential assembly 22 may receive torque via the ring gear 52 and provide torque to the axle shafts 24.

It is also contemplated that the axle assembly 10 may be provided in configurations that may not include an input yoke. For example, the axle assembly 10 may include an electric motor module. The electric motor module may be operatively connected to the differential assembly and may provide torque to the differential assembly. For example, the electric motor module may be operatively connected to the differential assembly and may provide torque to the differential assembly via the drive pinion.

Figure 3:
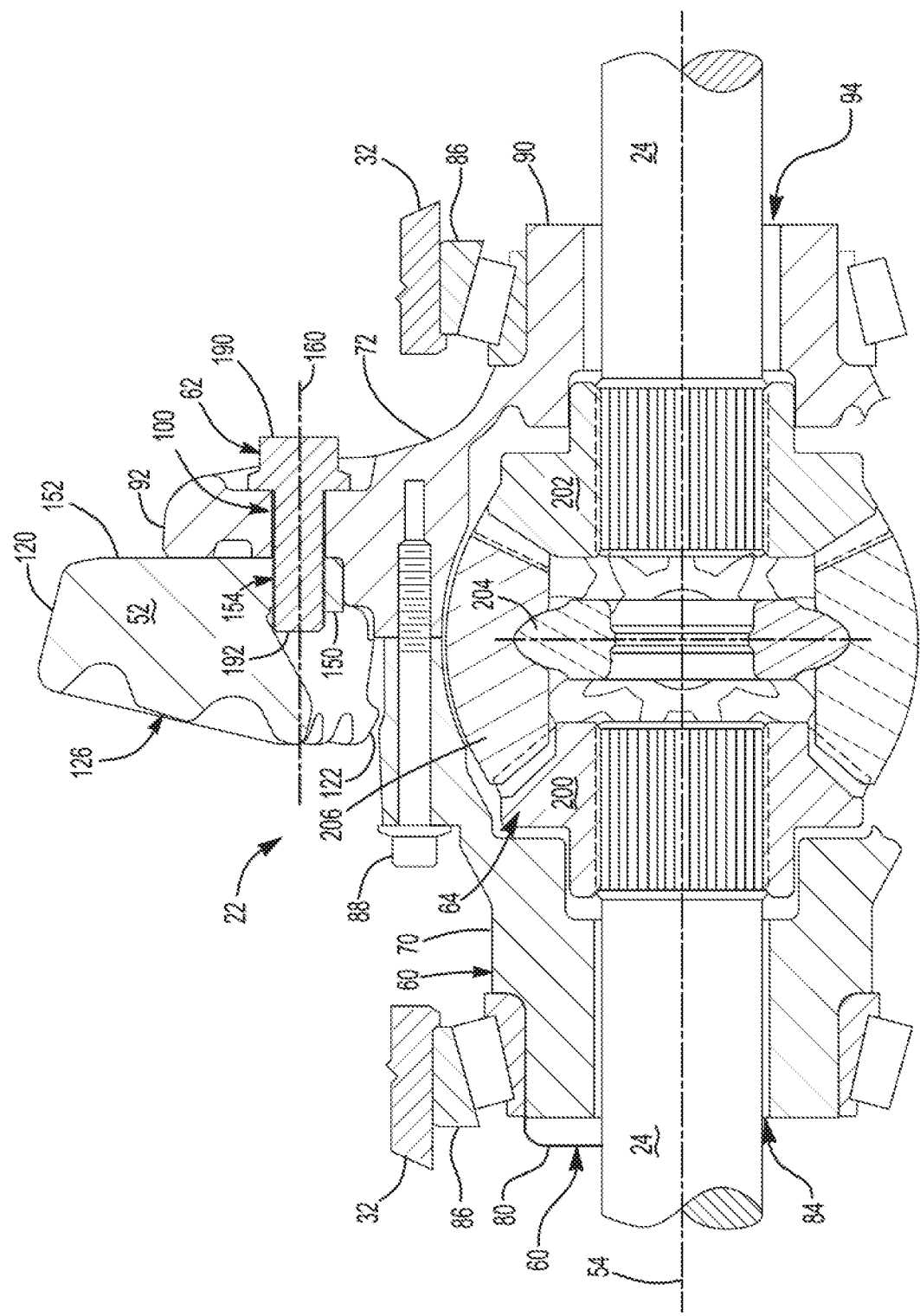
FIG. 3 is a partial cross-section view along section line 3-3 that also includes axle shafts that may be associated with the differential assembly.

Referring collectively to FIG. 2 and FIG. 3, an example of a differential assembly 22 is shown. The differential assembly 22 may be disposed in the center portion 40 of the housing assembly 20. The differential assembly 22 may transmit torque to the vehicle traction wheel assemblies and permit the traction wheel assemblies to rotate at different velocities. In addition to the ring gear 52, the differential assembly 22 may include a case 60, at least one fastener 62, and a differential unit 64.

The case 60 may be configured to receive components of the differential assembly 22. In addition, the case 60 may be rotatable about the axis 54. In at least one example, the case 60 may include a first case portion 70 and a second case portion 72 that may cooperate to at least partially define a cavity. In a specific example, the first case portion 70 abuts the second case portion 72 to define a gear nest cavity therebetween. The gear nest cavity may at least partially receive the differential unit 64.

Referring to the partial cross section of FIG. 3, the first case portion 70 may include a first bearing portion 80. The first bearing portion 80 may extend around the axis 54. In addition, the first case portion 70 may extend around and may at least partially define a first hole 84 through which an axle shaft 24 may extend. The first bearing portion 80 may be received in a roller bearing assembly 86 that may rotatably support the first case portion 70. The roller bearing assembly 86 may be mounted to the differential carrier 32.

The second case portion 72 may be mounted on the first case portion 70. For example, the second case portion 72 may be fixedly disposed at an end of the first case portion 70 with a weld or one or more fasteners 88, such as bolts, so that the second case portion 72 may not rotate or move with respect to the first case portion 70. In at least one configuration, the second case portion 72 may include a second bearing portion 90 and a case mounting flange 92.

The second bearing portion 90 may extend around the axis 54. In addition, the second case portion 72 may extend around and may at least partially define a second hole 94 through which another axle shaft 24 may extend. The second bearing portion 90 may be received in a roller bearing assembly 86 that may rotatably support the second case portion 72. The roller bearing assembly 86 may be mounted to the differential carrier 32.

The case mounting flange 92 may be axially positioned between the first case portion 70 and the second bearing portion 90. The case mounting flange 92 may extend continuously around the axis 54 and may extend away from the axis 54. The case mounting flange 92 may facilitate mounting of the ring gear 52. In at least one configuration, the case mounting flange 92 may include a plurality of through holes 100.

The though holes 100 may be arranged around the axis 54 and may facilitate mounting of the ring gear 52 as will be discussed in more detail below. The through holes 100 may be spaced apart from each other and may be disposed at the same radial distance from the axis 54 in one or more configurations. The through holes 100 may or may not be threaded.

Referring collectively to FIG. 2 and FIG. 3, one or more spider shaft holes 110 may be provided in the first case portion 70, the second case portion 72, or both. In the example shown, the first case portion 70 and the second case portion 72 cooperate to define one or more spider shaft holes 110 at a mating joint between the two case portions. A spider shaft hole 110 may receive a shaft of the spider of the differential unit 64 as will be discussed in more detail below.

The ring gear 52 may be fixedly mounted to the case 60. According to the example of FIG. 3, the ring gear 52 may be disposed on the case mounting flange 92 of the second case portion 72 and may be oriented such that the teeth of the ring gear 52 may face toward or extend toward the first case portion 70, or to the left from the perspective shown. In some examples, the ring gear 52 may include an outer side 120, an inner side 122, and a set of teeth 126.

The outer side 120 may face away from the axis 54. In addition, the outer side 120 may extend continuously around the axis 54.

The inner side 122 may be disposed opposite the outer side 120. As such, the inner side 122 may face toward the axis 54. The inner side 122 may also extend continuously around the axis 54 and may be spaced apart from the case 60. As such, the inner side 122 may at least partially define a hole or opening that may receive the case 60.

The ring gear 52 may include a first side 150 that faces toward the set of teeth 126. In at least one configuration, the first side 150 or a portion thereof may be disposed substantially perpendicular to the axis 54.

The ring gear 52 also includes a second side 152 disposed opposite the first side 150. In addition, the second side 152 may engage or contact the case 60. For instance, the second side 152 may engage or contact the case mounting flange 92 and may extend to the outer side 120. The second side 152 or a portion thereof may also be disposed substantially perpendicular to the axis 54.

A fastener hole 154 may extend from the first side 150 to the second side 152. As such, the fastener hole 154 may also be a through hole that extends through a portion of the ring gear 52. In addition, the fastener hole 154 may be threaded. The fastener hole 154 may extend along and may be centered about a fastener hole axis 160. In some examples, the fastener hole axis 160 is disposed parallel to the axis 54.

Referring primarily to FIG. 3, the set of teeth 126 may be arranged around the axis 54. Members of the set of teeth 126 may have any suitable configuration. For example, the teeth may have a spiral configuration, helical configuration, hypoid configuration, straight configuration, and so on. The set of teeth 126 may extend generally from the inner side 122 toward the outer side 120 of the ring gear 52.

The set of teeth 126 may overhang the fastener holes 154. For example, the set of teeth 126 may extend further toward the axis 54 than at least a portion of the fastener hole 154. As such, at least a portion of the inner side 122 may be located closer to the axis 54 than at least a portion of the fastener holes 154. The set of teeth 126 may overhang the fastener holes 154 in a manner that prevents a fastener 62 from being inserted into a fastener hole 154 from the tooth side of the ring gear 52 or from left to right from the perspective shown. As such, the set of teeth 126 may prevent a fastener 62 from being inserted into the fastener hole 154 in the ring gear 52 before being inserted into at least one through hole 100 in the case 60.

One or more fasteners 62 may couple the ring gear 52 to the case 60. Each fastener may be received in the through hole 100 of the case 60 and into a corresponding fastener hole 154 of the ring gear 52. The fasteners 62 may have any suitable configuration. For example, the fasteners 62 may be configured as bolts. In such a configuration, the fastener 62 may have a head 190 and a shank portion 192.

The head 190 may be disposed adjacent to the case mounting flange 92 and may engage the case mounting flange 92.

The shank portion 192 may extend from the head 190 toward the ring gear 52. The shank portion 192 may have a smaller diameter than the head 190 and may be partially or completely threaded. The shank portion 192 may extend through the through hole 100 and into the fastener hole 154. And in the case of a threaded bolt, the fastener 62 may include a threaded portion near a distal end that engages a corresponding threaded portion of the fastener hole 154. Moreover, the shank portion 192 may be spaced apart from the inner side 122. For example, the shank portion 192 may extend through and may protrude through the ring gear 52 such that the inner side 122 overhangs the shank portion 192 in an axial direction. In addition, the inner side 122 may overhang the shank portion 192 in a radial direction such that at least a portion of the inner side 122 may be located closer to the axis 54 than at least a portion of the shank portion 192.

In some alternate examples, a securing nut may optionally be provided to help secure the fastener 62. The nut may be disposed on an opposite side of ring gear 52 from the head 190 to generate a clamp force across the ring gear 52. The nut may also have a threaded hole to receive the shank portion 192 and mate with threads on the shank portion 192.

With particular reference to FIG. 3, the differential unit 64 may include a first gear 200, a second gear 202, a spider 204, and at least one pinion gear 206.

The first gear 200 may be disposed in the first case portion 70. For example, the first gear 200 may be at least partially disposed in the first hole 84 and may be configured to rotate about the axis 54. The first gear 200 may receive a first axle shaft 24. For example, the first gear 200 may have a spline that may mate with a corresponding spline on the first axle shaft 24 such that the first gear 200 may not rotate with respect to the first axle shaft 24. In addition, the first gear 200 may have a set of teeth that may be arranged around the axis 54 that may mate with teeth on one or more pinion gears 206.

The second gear 202 may be disposed opposite the first gear 200 and may have a similar or identical configuration as the first gear 200. For example, the second gear 202 to may be disposed in the second hole 94 of the second case portion 72 and also configured to rotate about the axis 54. The second gear 202 may receive a second axle shaft 24. For example, the second gear 202 may also have a spline that mates with a corresponding spline on the second axle shaft 24 such that the second gear 202 may not rotate with respect to the second axle shaft 24. In addition, the second gear 202 may have a set of teeth that may be arranged around the axis 54 that may mate with teeth on one or more pinion gears 206.

The spider 204 may rotate about the axis 54 with the case 60. In some examples, the spider 204 may include a plurality of shafts that may be received in corresponding spider shaft holes 110 of the case 60. The shafts may rotatably support the pinion gears 206.

At least one pinion gear 206 may be rotatably disposed on each of the plurality of shafts of the spider 204. Each pinion gear 206 may be disposed in the cavity of the case 60 and may be rotatably supported or retained on a corresponding shaft with one or more fasteners, such as a washer and/or a thrust bearing. Each pinion gear 206 may include a set of teeth that mate with teeth on the first gear 200 and teeth on the second gear 202.

Referring collectively to FIG. 1 through FIG. 3, the axle shafts 24 may transmit torque from the differential assembly 22 to corresponding traction wheel assemblies. Each axle shaft 24 may extend through a different arm portion 42 of axle housing 30. The axle shafts 24 may extend along and may be rotated about the axis 54 by the differential assembly 22. Each axle shaft 24 may have a first end and a second end. The first end may be coupled to the differential assembly 22. The second end may be disposed opposite the first end and may be operatively connected to a wheel end assembly that may have a wheel hub that may support a wheel. As shown in FIG. 1, an axle flange 210 may be disposed proximate the second end of the axle shaft 24 and may facilitate coupling of the axle shaft 24 to the wheel hub.

Figure 4:
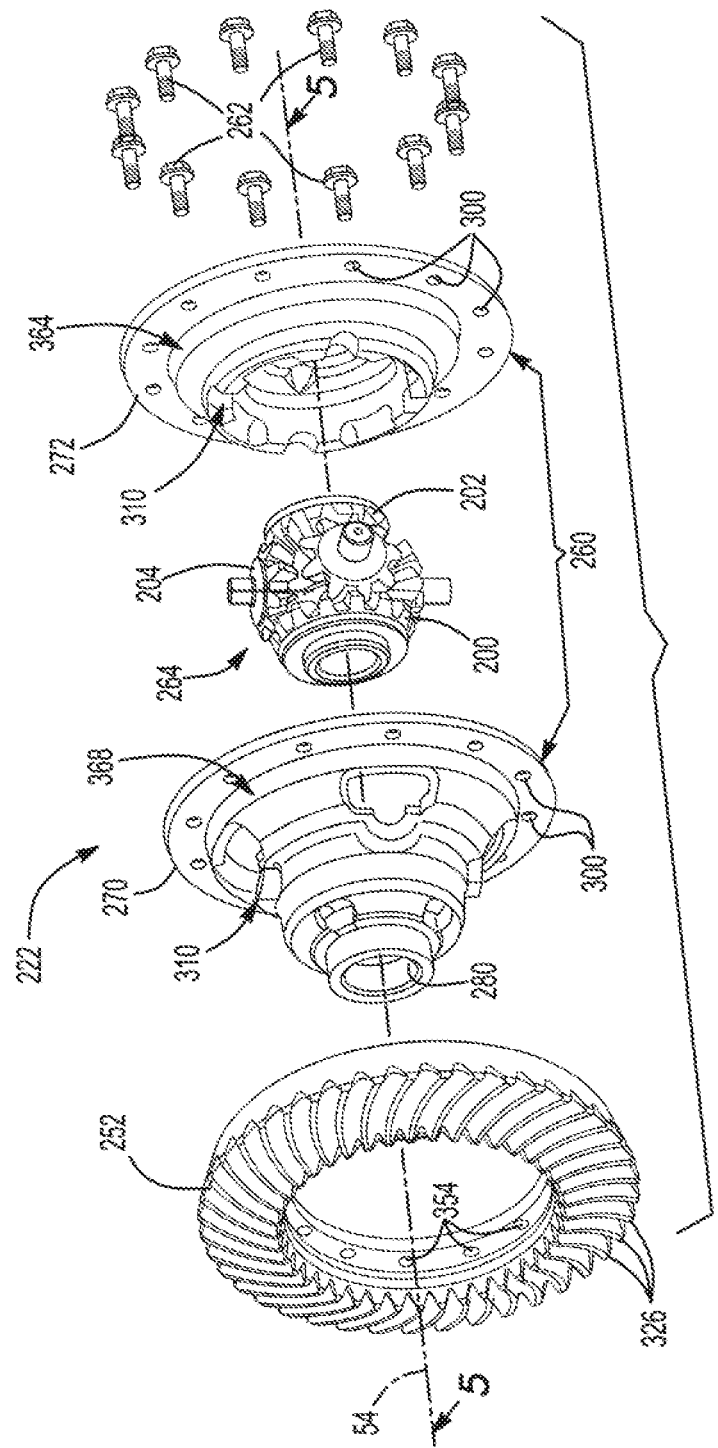
FIG. 4 is an exploded view of an additional example of a differential assembly.
Figure 5:
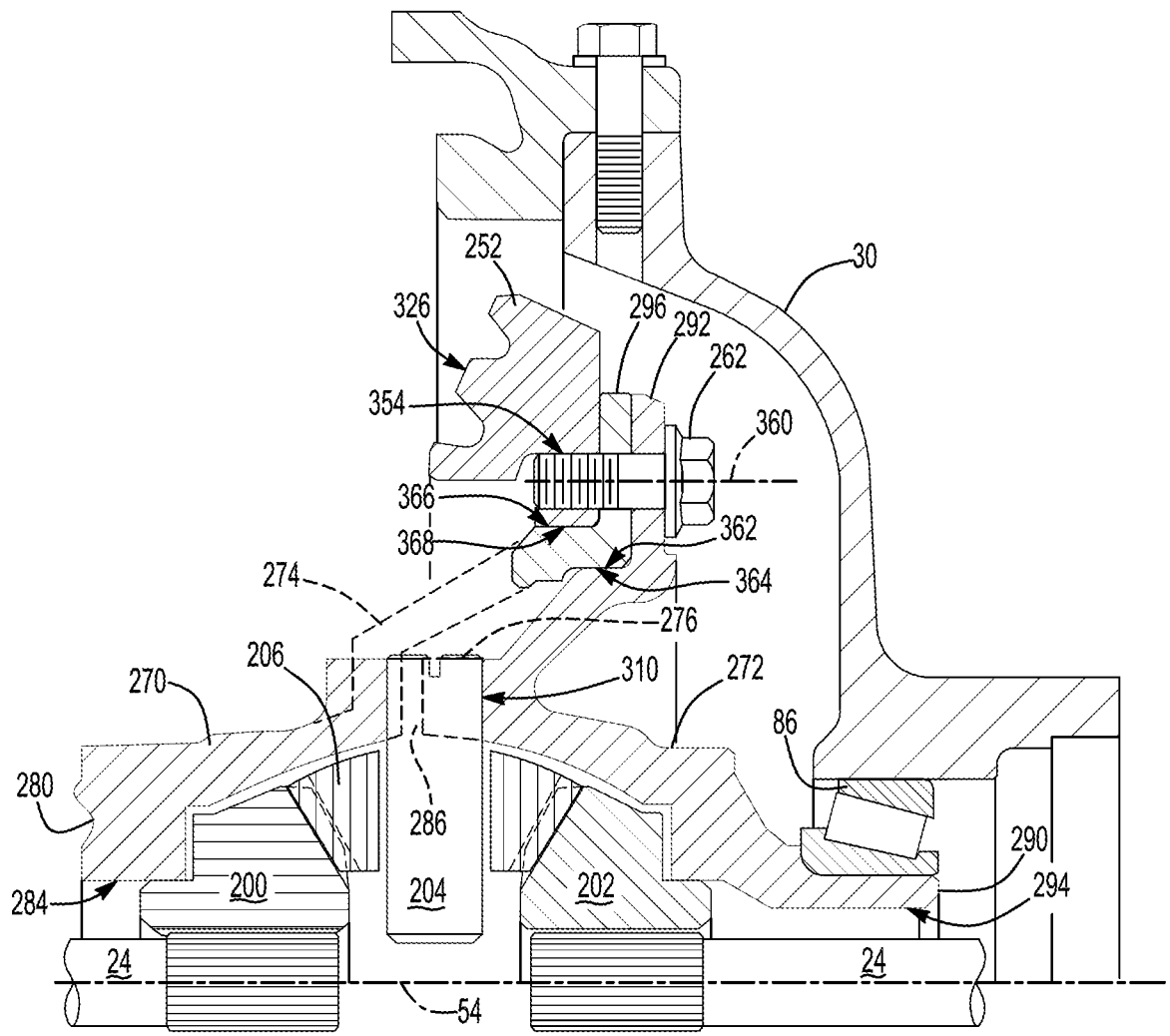
FIG. 5 is a partial cross-section view along section line 5-5 also includes axle shafts that may be associated with the differential assembly.

Referring collectively to FIG. 1, along with FIG. 4 and FIG. 5, an additional example of a differential assembly 222 is shown in an exploded view. Similar to previous examples, the differential assembly 222 may be disposed within a center portion 40 of a housing assembly 20. Also similar to previous examples, the differential assembly 222 may transmit torque to the vehicle traction wheel assemblies and permit the traction wheel assemblies to rotate at different velocities. The differential assembly 222 may include a ring gear 252, a case 260, at least one fastener 262, and a differential unit 264. However, unlike previous examples, and as discussed in more detail below, the differential assembly 222 may be provided with a simplified construction utilizing an integrated self-locating and fastening system.

The case 260 may be configured to receive components of the differential assembly 222, such as differential unit 264. In addition, the case 260 may be rotatable about the axis 54. In at least one example, the case 260 may be formed from a first case portion 270 and a second case portion 272 that may cooperate to at least partially define a cavity. The first case portion 270 abuts the second case portion 272 to define a gear nest cavity therebetween. And, this cavity may be configured to at least partially receive the differential unit 264.

Referring to the partial cross section of FIG. 5, the first case portion 270 may include a first bearing portion 280. The first bearing portion 280 may extend around the axis 54. In addition, the first case portion 270 may extend around and may at least partially define a first hole 284 through which one of the axle shafts 24 may extend. The first bearing portion 280 may be received in a roller bearing assembly that rotatably supports the first case portion 270. As discussed with reference to previous examples, the roller bearing assembly may be mounted to the differential carrier 32.

In the examples of FIG. 4 and FIG. 5, the second case portion 272 may be mounted directly to the first case portion 270. Specifically, the second case portion 272 may be affixed to an end of the first case portion 270 with one or more fasteners 262, such as bolts, so that the second case portion 272 may not rotate or move with respect to the first case portion 270. In at least one configuration, the second case portion 272 may include a second bearing portion 290 and a case mounting flange 292. The second case portion 272 may extend around and may at least partially define a second hole 294 through which one of the axle shafts 24 may extend. The second bearing portion 290 may be received in a roller bearing assembly that rotatably supports the second case portion 272.

The case mounting flange 292 may extend continuously around the axis 54 and may extend away from the axis 54. The case mounting flange 292 may also facilitate mounting of both of the first case portion 270 as well as the ring gear 252. The first case portion 270 may include a case mounting flange 296 that is configured to mate with case mounting flange 292. In at least one example, the case mounting flanges 292, 296 each include a plurality of through holes 300 through which fasteners 262 may be inserted. The through holes 300 are arranged around the axis 54 and may facilitate mounting of the first case portion 270 as well as the ring gear 252. The through holes 300 may be spaced apart from each other and may be disposed at the same radial distance from the axis 54 in one or more configurations. The through holes 300 may or may not be threaded.

One or more spider shaft holes 310 may be provided in the first case portion 270, the second case portion 272, or both. In the example shown, the first case portion 270 and the second case portion 272 cooperate to each define a portion of the spider shaft holes 310 at a mating joint between the two case portions. A spider shaft hole 310 may receive a shaft of the spider 204 of the differential unit 264.

With specific reference to the partial cross section of FIG. 5, the location of the section is through a spider shaft hole 310. Thus, there is a clearance portion provided in each of the first case portion 270 and the second case portion 272 such that the shaft of spider 204 may be received within the spider shaft hole 310. In areas outside of the cross-section depicted in FIG. 5, the first case portion 270 may be shaped in a non-clearance portion 274 as shown in phantom, also visualized in the exploded perspective view of FIG. 4. Also, the second case portion 272 may be shaped in a non-clearance portion 276 as shown in phantom outside of the cross-section of FIG. 5, also visualized in the exploded perspective view of FIG. 4.

With continued reference to the partial cross section of FIG. 5, the first case portion 270 and second case portion 272 may also be arranged to maintain a gap at regions closer to the axis 54 relative to the case mounting flanges 292, 296. Related to geometric tolerancing of the first case portion 270 and second case portion 272, an axial gap 286 is maintained around the perimeter of the case portions. The size of the axial gap 286 may be based on the geometric tolerances of each case portion. And, the axial gap 286 may be sized to exceed the result of a tolerance stack-up analysis by a small amount. At the same time, the first case portion 270 and second case portion 272 still cooperate to form the spider shaft holes 310 with tight enough tolerancing to hold the shaft of the spider 204 of the differential unit 264. According to some examples, first case portion 270 and the second case portion 272 are arranged to maintain a relative axial gap at all areas closer to the axis 54 than the first nesting portion and the second nesting portion.

The ring gear 252 may be fixedly mounted to the case 260. According to some examples, the ring gear 252 is disposed on the case mounting flange 296 of the first case portion 270 and may be oriented such that the teeth of the ring gear 252 may face toward or extend toward the first case portion 270, or to the left from the perspective shown in FIG. 5. Like previous examples, the ring gear 252 includes an outer side, an inner side, and a set of teeth 326.

Unlike previous examples, the joint between the first case portion 270 and second case portion 272, along with the joint between the ring gear 252 and the case 260, are integrated into a single joint. In some examples, the first case portion 270 is mated to the second case portion 272, and the ring gear 252 is mated to the same joint, thereby sandwiching the case mounting flange 296 of the first case portion 270.

The ring gear 252 includes a plurality of fastener holes 354 configured to receive at least a portion of a fastener 262. In some examples, the fastener hole 354 may be a through hole that extends through a portion of the ring gear 252. In other examples the fastener hole 354 may be a closed hole extending only partially through the ring gear 252. In addition, the fastener hole 354 may be threaded. Moreover, the fastener hole 354 may extend along and may be centered about a fastener hole axis 360. In some examples, the fastener hole axis 360 is disposed parallel to the axis 54. Similar to previous examples, gear teeth of the ring gear 252 may overhang the fastener hole 354 in a manner that prevents the fastener 262 from being inserted into the fastener hole 354 before being inserted through at least one through hole 300 of the first case portion 270 and the second case portion 272.

Each of the first case portion 270 and the second case portion 272 includes nesting portions that self-align the case portions with respect to each other during assembly to facilitate joining. As best seen in FIG. 5, the first case portion 270 is configured to circumscribe at least a portion of the second case portion 272. The first case portion 270 includes at least one axially-extending nesting feature 362 having an internal diameter sized to interface with an external diameter of a nesting feature 364 of the second case portion 272. Each of the nesting features may extend continuously around the axis 54. In alternate examples, one or both of the internal nesting feature 362 and the external nesting feature 364 may be intermittently spaced around axis 54 as opposed to being continuous.

Each of the nesting features 362, 364 may extend in a direction generally parallel to the axis 54. In this way, when the first case portion 270 is mated to the second case portion 272, it may be assembled along a direction parallel to axis 54. Thus, as the first case portion 270 is mated, the internal nesting feature 362 engages the external nesting feature 364 of the second case portion 272. In some examples, the nesting feature 362 defines an inside diameter substantially equal to an outside diameter of the nesting feature 364. The two components of the case 260 are thus self-aligned during mating without the need for additional alignment features. A key benefit of the self-alignment features is robust alignment of the through holes 300 of the first case portion 270 with the through holes 300 of the second case portion 272. In some alternate examples, the nesting feature 362 and/or the nesting feature 364 include a draft angle such that the case portions generate a wedge fit with respect to each other when assembled.

Each of the ring gear 252 and the first case portion 270 also includes features that self-align the ring gear to the case with respect to each other to facilitate joining. Also seen in FIG. 5, the ring gear 252 is configured to circumscribe at least a portion of the first case portion 270. The ring gear 252 includes at least one nesting feature 366 having an internal diameter sized to interface with an external diameter of nesting feature 368 of the first case portion 270. Each of the nesting features may extend continuously around the axis 54. In alternate examples, one or both of the internal nesting feature 366 and the external nesting feature 368 may be intermittently spaced around axis 54 as opposed to being continuous.

Like the nesting features of the case 260, each of the nesting features 366, 368 may extend in a direction generally parallel to the axis 54. In this way, when the ring gear 252 is mated to the first case portion 270, it may be assembled along a direction parallel to axis 54. Thus, as the ring gear 252 is mated, the internal nesting feature 366 engages the external nesting feature 368 of the first case portion 270. In some examples, the internal nesting feature 366 defines an inside diameter substantially equal to an outside diameter of the external nesting feature 368. The ring gear 252 is thus self-aligned during mating without the need for additional alignment features. Similar to that discussed above, the self-alignment features provide robust alignment of the fastener holes 354 of the ring gear 252 with the through holes 300 of the first case portion 270 and the second case portion 272. Once the three components are mated to each other, the fastener holes 354 of the ring gear, through holes 300 of the first case portion, and through holes of the second case portion 272 may all be concentrically aligned about fastener hole axis 360. In some alternate examples, the nesting feature 366 and/or the nesting feature 368 include a draft angle such that the ring gear generates a wedge fit with respect to the first case portion 270 when assembled.

Once the ring gear 252, first case portion 270, and second case portion are mated, fastener 262 may be driven along fastener hole axis 360. According to some examples, fastener 262 is a threaded bolt, however it should be appreciated that other fastener types may be suitable to join the components. In the example of the bolted fastener 262, any of the through holes 300 and the fastener holes 354 may include a threaded portion to engage a corresponding threaded portion of the fastener 262. In a preferred example, only the fastener holes 354 are threaded, and all of the through holes 300 are unthreaded and sized to provide clearance to the fastener 262.

In some alternate examples, a securing nut may optionally be provided to secure the fastener 262. The securing nut may be disposed on an opposite side of ring gear 252 from the head of the fastener 262 to generate a clamp force across the ring gear 252, case mounting flange 296, and case mounting flange 292. The nut may also include a threaded hole to receive a corresponding threaded portion of the fastener 262.

According to the configuration discussed immediately above, the case mounting flange 296 of the first case portion 270 is sandwiched between the case mounting flange 292 of the second case portion 272 and the ring gear 252 in an axial direction relative to axis 54. Arranging the three components in this fashion allows for all three to be secured in a single integrated joint. As a result, this configuration allows for elimination of an additional set of fasteners as provided in the first example of the present disclosure. Moreover, weight may be reduced due to less components, and less structure required associated with elimination of an extra set of bolted joints. Lastly cost is reduced due to both the elimination of components, as well as less machining required for the threaded portions of the eliminated set of bolted joints.

Also, according to the configuration discussed immediately above, an axially-extending portion of the first case portion 270 is sandwiched between the second case portion 272 and the ring gear 252 in a radial direction relative to axis 54. Arranging the three components in this fashion allows for all three to be self-aligned during assembly without the need for additional locating features, further reducing part complexity and weight. Moreover, the examples of the present disclosure may be employed without changing or enlarging the case of the differential or the axle housing, thereby reusing many existing components while helping reduce associated costs and weight.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A differential assembly comprising:
a first case rotatable about an axis and defining a first mounting flange having a through hole;
a second case abutting the first case to define a gear nest cavity therebetween, the second case further defining a second mounting flange having a through hole and formed to mate to the first mounting flange;
a ring gear mounted to the first mounting flange; and
a fastener extending through the through hole of both the first mounting flange and second mounting flange into a fastener hole of the ring gear, wherein the first mounting flange is sandwiched between the second mounting flange and the ring gear, the first case and the second case cooperate to define a spider shaft hole that receives a shaft of a spider that rotatably supports a pinion gear, and a gap is located between the first case and the second case that extends away from the axis from the spider shaft hole and from an end of the shaft of the spider that faces away from the axis.

2. The differential assembly of claim 1 wherein the fastener includes a threaded portion near a distal end that engages the fastener hole.

3. The differential assembly of claim 2 wherein each through hole of the first mounting flange and the second mounting flange are unthreaded and provide clearance to a shank portion of the fastener.

4. The differential assembly of claim 1 wherein the first case defines a first nesting feature and the second case defines a second nesting feature, and the first nesting feature is configured to engage the second nesting feature during assembly to self-align the first case with respect to the second case.

5. The differential assembly of claim 4 wherein the first nesting feature and the second nesting feature are each oriented to be substantially parallel to the axis.

6. The differential assembly of claim 4 wherein the first nesting feature and second nesting feature engage to radially align the first case to the second case.

7. The differential assembly of claim 4 wherein the first nesting feature defines an inside diameter relative to the axis that is substantially equal to an outside diameter of the second nesting feature.

8. The differential assembly of claim 4 wherein the ring gear defines a third nesting feature that engages an axially-extending portion of the first nesting feature during assembly to self-align the ring gear with respect to the first case.

9. The differential assembly of claim 1 wherein the ring gear further comprises a set of teeth that overhangs the fastener hole in a manner that prevents the fastener from being inserted into the fastener hole before being inserted through one of the through holes.

10. The differential assembly of claim 1 wherein the first case defines an axially-extending first nesting feature that is sandwiched between the second case and the ring gear in a radial direction relative to the axis.

11. The differential assembly of claim 1 wherein the fastener has a head and a shank that extends from the head, wherein the head is disposed adjacent to the second mounting flange and the shank extends through the through holes of the first and second mounting flanges and the fastener hole.

12. The differential assembly of claim 1 wherein the first case and the second case are arranged to maintain an axial gap therebetween at all areas closer to the axis than the first mounting flange and the second mounting flange.

13. A differential assembly comprising:
a first case rotatable about an axis and defining a first nesting portion;
a second case defining a second nesting portion that contacts and nests with the first nesting portion;
a ring gear mounted to the first case and configured to nest with the first nesting portion; and
a fastener extending through the first case and the second case into a fastener hole of the ring gear, wherein the first case is sandwiched between the second case and the ring gear, the first case and the second case cooperate to define a spider shaft hole that receives a shaft of a spider that rotatably supports a pinion gear, and a gap is located between the first case and the second case that extends away from the axis from the spider shaft hole and from an end of the shaft of the spider that faces away from the axis to the second nesting portion such that the gap is completely disposed further from the axis than the spider shaft hole is disposed from the axis.

14. The differential assembly of claim 13 wherein each of the first nesting portion and the second nesting portion includes a radially-extending mounting flange defining a through hole and the fastener extends axially through the through hole of the second nesting portion and the first nesting portion into the ring gear.

15. The differential assembly of claim 14 wherein the radially-extending mounting flange of the first nesting portion is sandwiched between the radially-extending mounting flange of the second nesting portion and the ring gear.

16. The differential assembly of claim 13 wherein the first nesting portion defines an axially-extending first nesting feature configured to engage the second nesting portion during assembly to self-align the first case with respect to the second case.

17. The differential assembly of claim 16 wherein the first nesting feature defines an inside diameter substantially equal to an outside diameter of the second nesting portion.

18. The differential assembly of claim 16 wherein the ring gear engages the axially-extending first nesting feature to radially align the ring gear to the first case.

19. The differential assembly of claim 16 wherein the axially-extending first nesting feature is sandwiched between the second case and the ring gear in a radial direction relative to the axis.

20. The differential assembly of claim 13 wherein the ring gear defines an inner diameter substantially equal to an outer diameter of the first nesting portion.

* * * * *